US011226504B2

United States Patent
O'Keefe et al.

(10) Patent No.: US 11,226,504 B2
(45) Date of Patent: Jan. 18, 2022

(54) FREE-CARRIER ABSORPTION VARIABLE OPTICAL ATTENUATORS AND THERMAL PHASE SHIFTERS FORMED BY AN OPTICAL WAVEGUIDE HAVING MULTIPLE PASSES IN AN INTRINSIC REGION

(71) Applicant: Ciena Corporation, Hanover, MD (US)

(72) Inventors: Sean Sebastian O'Keefe, Dunrobin (CA); Alexandre Delisle-Simard, Québec (CA); Yves Painchaud, Québec (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/516,381

(22) Filed: Jul. 19, 2019

(65) Prior Publication Data

US 2021/0018768 A1    Jan. 21, 2021

(51) Int. Cl.
*G02F 1/025* (2006.01)
*G02F 1/015* (2006.01)

(52) U.S. Cl.
CPC ...... *G02F 1/025* (2013.01); *G02F 2001/0156* (2013.01)

(58) Field of Classification Search
CPC ............................. G02F 1/025; G02F 1/0156
USPC .................................................... 385/2
See application file for complete search history.

(56) References Cited

U.S. PATENT DOCUMENTS

| | | | |
|---|---|---|---|
| 5,729,641 A | 3/1998 | Chandonnet et al. | |
| 6,246,826 B1 | 6/2001 | O'Keefe et al. | |
| 6,590,665 B2 | 7/2003 | Painchaud et al. | |
| 6,937,793 B2 | 8/2005 | Lelievre et al. | |
| 7,397,101 B1 * | 7/2008 | Masini ................ | H01L 31/028 257/184 |

(Continued)

FOREIGN PATENT DOCUMENTS

| | | |
|---|---|---|
| GB | 2 394 598 A | 4/2004 |
| JP | 2013 003442 A | 1/2013 |

OTHER PUBLICATIONS

Nov. 4, 2020, Invitation to Pay Additional Fees and Annex to Form PCT/ISA/206 Communication Relating to the Results of the Partial International Search for International Application No. PCT/US2020/041877.

*Primary Examiner* — Sung H Pak
(74) *Attorney, Agent, or Firm* — Clements Bernard Baratta; Lawrence A. Baratta, Jr.; Christopher L. Bernard

(57) ABSTRACT

The present disclosure provides a multi-pass free-carrier absorption variable optical attenuator device, including: a diode structure including a P-type doped region and an N-type doped region separated by an intrinsic region; and an optical waveguide including a plurality of optical waveguide sections aligned parallel to one another and disposed between the P-type doped region and the N-type doped region and within the intrinsic region of the diode structure. Further, the present disclosure provides a multi-pass thermal phase shifter device, including: a silicon structure including or coupled to one or more heater elements; and an optical waveguide including a plurality of optical waveguide sections aligned parallel to one another and disposed adjacent to the one or more heater elements. Optionally, at least two of the optical waveguide sections have different geometries and are separated by a predetermined gap.

18 Claims, 11 Drawing Sheets

(56) References Cited

U.S. PATENT DOCUMENTS

| | | | |
|---|---|---|---|
| 7,483,641 B1 | 1/2009 | Mak | |
| 7,627,203 B2 * | 12/2009 | Chen | G02F 1/0147 |
| | | | 385/129 |
| 8,406,621 B2 | 3/2013 | Painchaud et al. | |
| 8,639,073 B2 | 1/2014 | Pelletier et al. | |
| 9,703,047 B2 | 7/2017 | Painchaud et al. | |
| 9,841,618 B1 | 12/2017 | Poulin et al. | |
| 9,851,521 B2 | 12/2017 | Pelletier et al. | |
| 9,941,973 B2 | 4/2018 | Simard et al. | |
| 9,946,099 B2 * | 4/2018 | Gill | G02B 6/132 |
| 10,209,127 B2 | 2/2019 | Luk et al. | |
| 10,365,507 B2 * | 7/2019 | Ishikura | G02F 1/0147 |
| 2007/0172189 A1 * | 7/2007 | Koehl | H01S 5/50 |
| | | | 385/131 |
| 2008/0090158 A1 | 4/2008 | Painchaud et al. | |
| 2008/0095490 A1 * | 4/2008 | Ashkenazi | G01H 9/004 |
| | | | 385/13 |
| 2008/0144989 A1 * | 6/2008 | Sakurai | G02F 1/3132 |
| | | | 385/3 |
| 2012/0195547 A1 * | 8/2012 | Rasras | G02F 1/2257 |
| | | | 385/16 |
| 2012/0243828 A1 | 9/2012 | Suzuki | |
| 2013/0058606 A1 * | 3/2013 | Thomson | G02B 6/136 |
| | | | 385/14 |
| 2013/0188918 A1 | 7/2013 | Painchaud et al. | |
| 2014/0118748 A1 * | 5/2014 | Rubio Guivernau | |
| | | | G01B 9/02091 |
| | | | 356/479 |
| 2016/0246157 A1 * | 8/2016 | Dumais | G02F 1/2257 |
| 2016/0334648 A1 * | 11/2016 | Lu | G02F 1/2257 |
| 2018/0173025 A1 * | 6/2018 | McGeer | G02F 1/2257 |
| 2018/0341126 A1 * | 11/2018 | Ishikura | G02F 1/0147 |
| 2018/0373067 A1 * | 12/2018 | Fujikata | G02F 1/025 |

* cited by examiner

FREE-CARRIER ABSORPTION VARIABLE OPTICAL ATTENUATORS AND THERMAL PHASE SHIFTERS FORMED BY AN OPTICAL WAVEGUIDE HAVING MULTIPLE PASSES IN AN INTRINSIC REGION

TECHNICAL FIELD

The present disclosure relates generally to the optical components. More particularly, the present disclosure relates to multi-pass free-carrier absorption variable optical attenuators (VOAs) implemented in silicon photonics (SiP) that optimize attenuation as a function of both drive current and total power dissipation, as well as multi-pass thermal phase shifters (TPSs) designed to optimize power consumption.

BACKGROUND

In general, it is desirable to increase the efficiency of free-carrier VOAs, as well as to provide such devices fabricated using typical SiP fabrication processes. Here, the primary efficiency is defined in terms of achieved attenuation relative to a typical control voltage, control current, and total dissipated power for the devices. Secondarily, it is desirable that a smaller VOA can be fabricated, with fewer sections, to achieve the same attenuation, with lower power dissipation and smaller drive/control electronics.

Likewise, in integrated optics, low-speed but low-power consumption phase shifters are important building blocks because of the difficulty in precisely controlling the phase of an optical wave propagating in a waveguide. Although fabricated waveguide lengths are generally known precisely, the roughness associated with the waveguide randomly changes the optical mode effective index and, thus, makes the phase uncertainty larger than $2\pi$ radians. As a result, active control of the phase is included in most interferometer-based structures. Thus, there is a need to improve the power efficiency of such phase-shifting building blocks.

SUMMARY

In general, the present disclosure provides multi-pass free-carrier absorption VOAs implemented in SiP that optimize attenuation as a function of both drive current and total power dissipation, as well as multi-pass TPSs designed to optimize power consumption.

Related to the multi-pass free-carrier absorption VOAs, the present disclosure provides a way of increasing the efficiency, while utilizing a typical SiP fabrication process. The primary efficiency is in terms of achieved attenuation relative to a typical control voltage, control current, and total dissipated power of the devices. Secondarily, there is an advantageous effect of being able to fabricate a smaller VOA, with fewer sections, to achieve the same attenuation, with lower power dissipation and smaller drive/control electronics. The present disclosure delivers these improvements by increasing the optical attenuation of a segment of the VOA by increasing the number of optical waveguides that are contained in the current flow of its P-type, Intrinsic, N-type (PIN) diode, thus "recycling" the current, instead of simply concatenating additional segments and suffering from the added power dissipation of additional diode "turn-on" or "knee" voltages.

In one embodiment, the present disclosure provides a multi-pass free-carrier absorption variable optical attenuator device, including a diode structure including a P-type doped region and an N-type doped region separated by an intrinsic region; and an optical waveguide including a plurality of optical waveguide sections aligned parallel to one another and disposed between the P-type doped region and the N-type doped region and within the intrinsic region of the diode structure. The P-type doped region forms a portion of an anode connection of the diode structure. The N-type doped region forms a portion of a cathode connection of the diode structure. The plurality of optical waveguide sections is connected via one or more connecting curved/bent sections of the optical waveguide. Optionally, at least two of the optical waveguide sections have different geometries and are separated by a predetermined gap. Optionally, at least two of the optical waveguide sections have different widths and are separated by the predetermined gap.

In another embodiment, the present disclosure provides a silicon photonics method for fabricating a multi-pass free-carrier absorption variable optical attenuator device, including providing a diode structure including a P-type doped region and an N-type doped region separated by an intrinsic region; and disposing an optical waveguide including a plurality of optical waveguide sections aligned parallel to one another between the P-type doped region and the N-type doped region and within the intrinsic region of the diode structure. The P-type doped region forms a portion of an anode connection of the diode structure. The N-type doped region forms a portion of a cathode connection of the diode structure. The plurality of optical waveguide sections is coupled via one or more connecting curved/bent sections of the optical waveguide. Optionally, at least two of the optical waveguide sections have different geometries and are separated by a predetermined gap. Optionally, at least two of the optical waveguide sections have different widths and are separated by the predetermined gap.

Related to the multi-pass TPS, the present disclosure provides low-speed but low-power consumption phase shifters, which are again important building blocks because of the difficulty in precisely controlling the phase of an optical wave propagating in a waveguide. Although fabricated waveguide lengths are generally known precisely, the roughness associated with the waveguide randomly changes the optical mode effective index and, thus, makes the phase uncertainty larger than $2\pi$ radians. As a result, active control of the phase is included in most interferometer-based structures. Thus, the present disclosure improves the power efficiency of such phase-shifting building blocks.

In a further embodiment, the present disclosure provides a multi-pass thermal phase shifter device, including a silicon structure including or coupled to one or more heater elements; and an optical waveguide including a plurality of optical waveguide sections aligned parallel to one another and disposed adjacent to the one or more heater elements. The silicon structure can include one or more P-type doped or N-type doped regions that form the one or more heater elements, or the heater elements could be separate from the silicon itself and made of various resistive materials (tantalum nitride, titanium nitride, or other resistive metals) but be fabricated in close proximity to the silicon waveguides. The plurality of optical waveguide sections is coupled via one or more connecting curved/bent sections of the optical waveguide. Optionally, at least two of the optical waveguide sections have different geometries and are separated by a predetermined gap. Optionally, the at least two of the optical waveguide sections have different widths and are separated by the predetermined gap.

In a still further embodiment, the present disclosure provides a silicon photonics method for fabricating a multi-pass thermal phase shifter device, including providing a silicon structure including or coupled to one or more heater elements; and disposing an optical waveguide including a plurality of optical waveguide sections aligned parallel to one another adjacent to the one or more heater elements. The silicon structure includes one or more P-type doped or N-type doped regions that form the one or more heater elements, or the heater elements could be separate from the silicon itself and made of various resistive materials (tantalum nitride, titanium nitride, or other resistive metals) but be fabricated in close proximity to the silicon waveguides. The plurality of optical waveguide sections is coupled via one or more connecting curved/bent sections of the optical waveguide. Optionally, at least two of the optical waveguide sections have different geometries and are separated by a predetermined gap. Optionally, the at least two of the optical waveguide sections have different widths and are separated by the predetermined gap.

BRIEF DESCRIPTION OF THE DRAWINGS

The present disclosure is illustrated and described herein with reference to the various drawings, in which like reference numbers are used to denote like device components/method steps, as appropriate, and in which.

DESCRIPTION OF EMBODIMENTS

Again, related to the multi-pass free-carrier absorption VOAs, the present disclosure provides a way of increasing the efficiency, while utilizing a typical SiP fabrication process. The primary efficiency is in terms of achieved attenuation relative to a typical control voltage, control current, and total dissipated power of the devices. Secondarily, there is an advantageous effect of being able to fabricate a smaller VOA, with fewer sections, to achieve the same attenuation, with lower power dissipation and smaller drive/control electronics. The present disclosure delivers these improvements by increasing the optical attenuation of a segment of the VOA by increasing the number of optical waveguides that are contained in the current flow of its P-type, Intrinsic, N-type (PIN) diode, thus "recycling" the current, instead of simply concatenating additional segments and suffering from the added power dissipation of additional diode "turn-on" or "knee" voltages.

Figure 1:
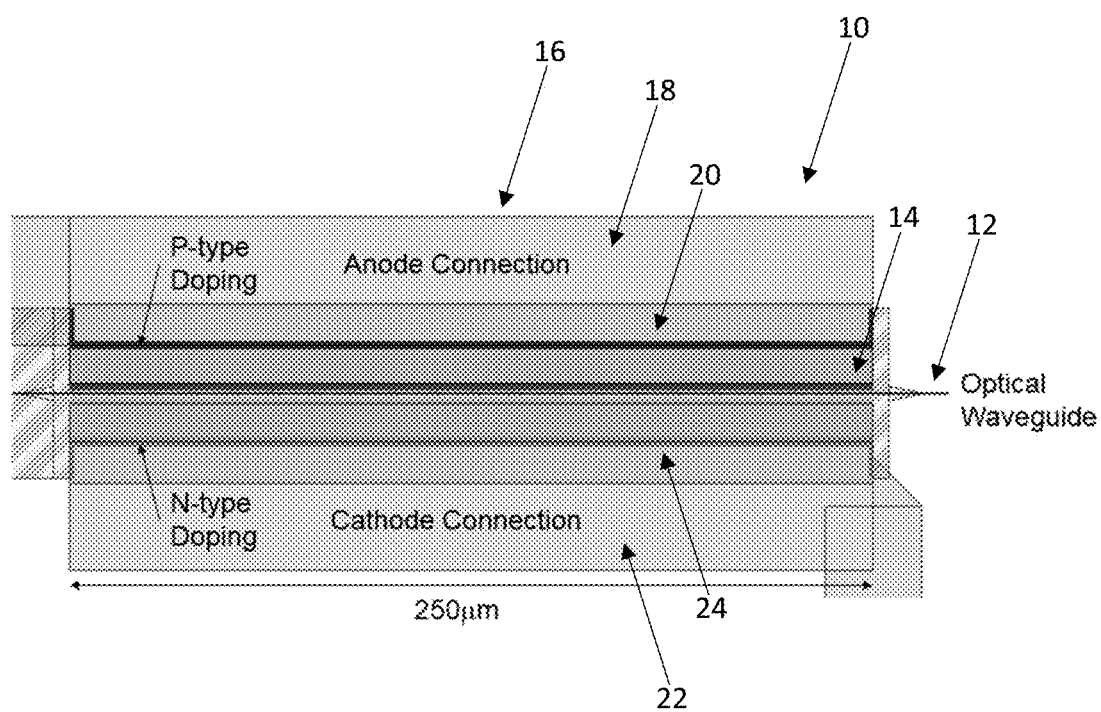
FIG. 1 is a schematic diagram illustrating a conventional SiP VOA, utilizing a one-pass waveguide.
Figure 2:
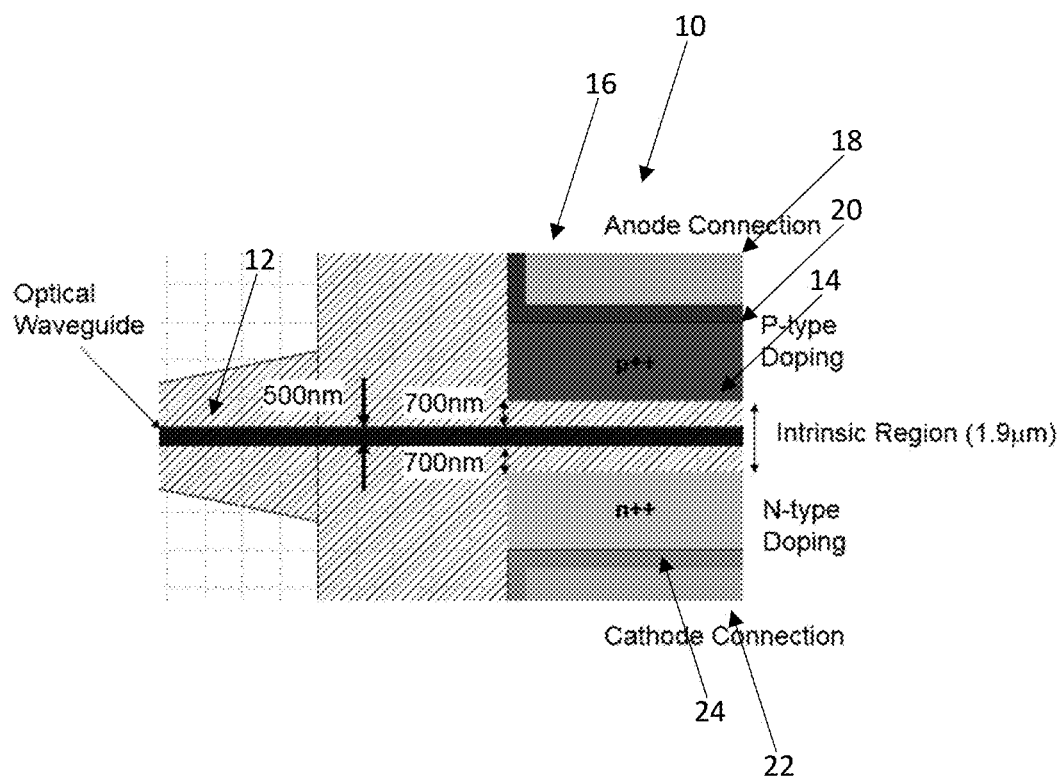
FIG. 2 is another schematic diagram illustrating a conventional SiP VOA, utilizing a one-pass waveguide.

Referring now specifically to FIGS. 1 and 2, a free-carrier VOA 10 fabricated in a standard SiP process is realized as an optical waveguide 12 that passes through the intrinsic region 14 of a forward-biased PIN diode structure 16 as a unit cell. The forward-biased PIN diode structure 16 includes an anode connection 18 including a P-type doped region 20 and a cathode connection 22 including an N-type doped region 24. For a given length, and for a given current, a given attenuation is achieved for the unit cell. The optical attenuation in this structure is proportional to the current flowing through the diode 16 and, thus, through the waveguide 12, but there are practical limitations on the current flowing through the device 10, so to increase the attenuation, more unit cells are added optically in-series and electrically either in-series or in-parallel.

Parallel electrical combinations of these unit cells require high drive current from the external circuitry, while series electrical combinations of these unit cells require high drive voltage from the external circuitry. In the electrically in-parallel configuration, high currents require physically large components to be able to efficiently generate and deliver this current. In the electrically in-series configuration, there is notably larger power inefficiency due to the multiple diode "turn-on" voltages that must first be overcome such that notable current is generated in the structure. Thus, there are practical limitations on both types of external circuitry. The goal is to improve the intrinsic efficiency of such a VOA unit cell.

The premise of the present disclosure is that if two or more waveguides can be put into the same junction, then the same current may be "recycled" or "reused" in the second waveguide, thus doubling the attenuation for the same current (and the same voltage and, thus, the same power). This can be extended to 3 or more waveguides as well.

Figure 3:
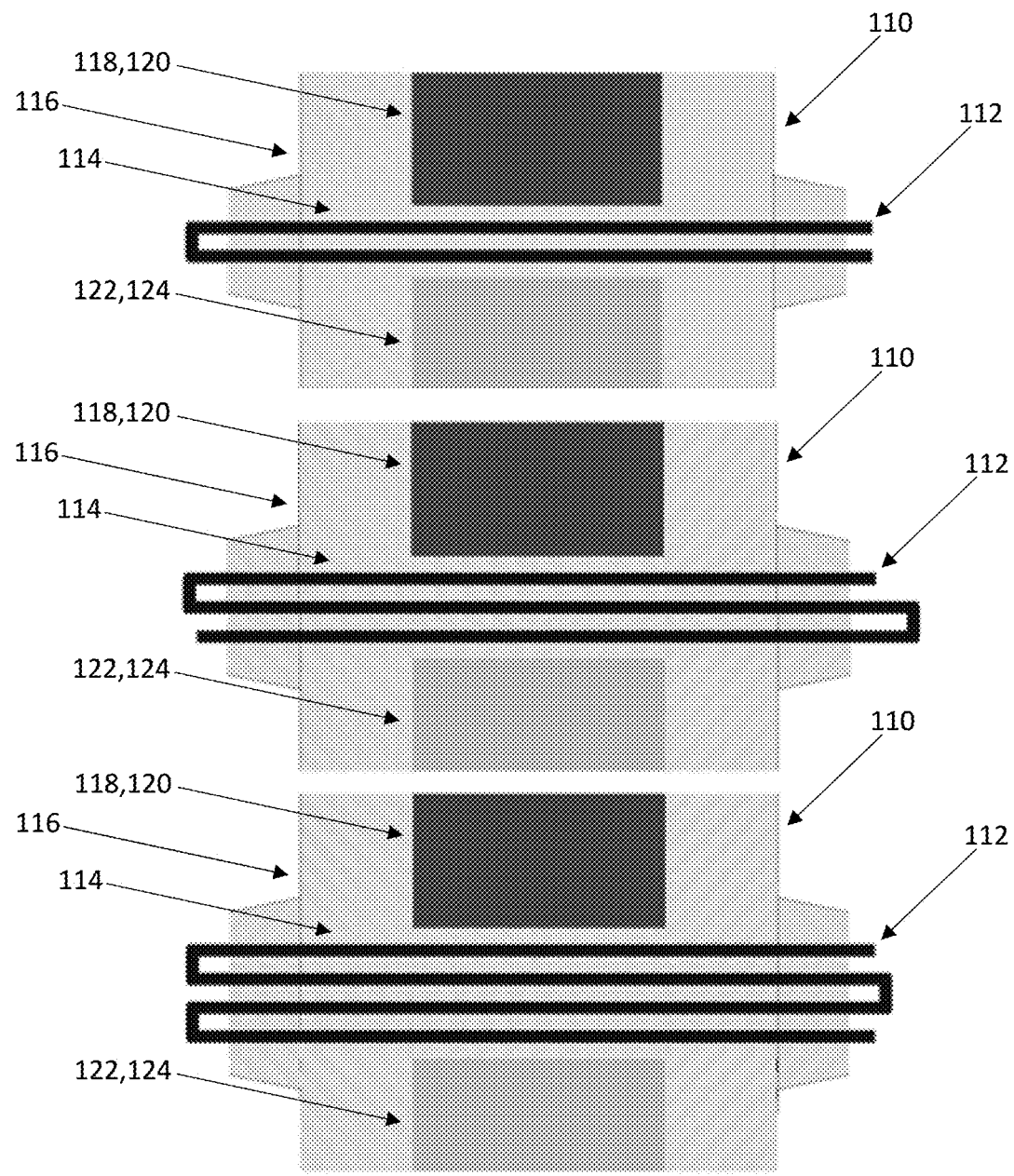
FIG. 3 is a series of schematic diagrams illustrating several example embodiments of the SiP VOA of the present disclosure, utilizing a two-pass waveguide, a three-pass waveguide, and a four-pass waveguide, respectively.

Referring now specifically to FIG. 3, in several example embodiments, the VOA device 110 of the present disclosure utilizes a waveguide 112 that traverses the intrinsic region 114 between the anode connection 118 and P-type doped region 120 and the cathode connection 122 and N-type doped region 124 of the diode 116 multiple times, in a serpentine fashion. Specifically, two-pass, three-pass, and four-pass embodiments are illustrated. Here, the bend radius/radii of the waveguide 112 must be controlled and minimized; however, the length scales of the VOA components are on the order of hundreds of microns, and the bend radius of the optical waveguides are on the order of 10's of microns.

The intrinsic region 114 is an area that is not intentionally-doped but may contain unavoidable background doping from the P-type doped region 120 and the N-type doped region 124. While the VOA device 110 is illustrated herein with a PIN structure, those of ordinary skill in the art will recognize it could also be constructed with a PN structure (i.e., without the intrinsic region 114).

The reality of adding a second, or third, or fourth waveguide means that the width of the intrinsic region in the PIN structure needs to be increased. A more careful look at the equations governing the behavior of a SiP free-carrier VOA (equations 1-5) shows that the attenuation is not only proportional to the charge (i.e., free-carrier) concentration (i.e., the current), but also to the free-carrier lifetime in the intrinsic region.

$$atten_{dB} = \frac{10}{\ln(10)}(6.0 \times 10^{-18} p + 8.5 \times 10^{-18} n)L \quad (1)$$

$$atten_{dB} = 6.297 \times 10^{-17} nL \quad (2)$$

$$I = \frac{Q}{\tau_{rec}} = \frac{qAnL}{\tau_{rec}} \quad (3)$$

$$I = \frac{q}{6.297 \times 10^{-17}} \frac{A atten_{dB}}{\tau_{rec}} \quad (4)$$

$$atten_{db} = const \times \tau_{rec} \times I \quad (5)$$

This free carrier lifetime is made up of several components (equation 6), but it is dominated by the surface recombination velocity of the silicon waveguide, and predominantly by that of the top surface (i.e., the last term in equation 6). The relationship is linear in the length of the top surface exposed to the current flow, so doubling the intrinsic region width cancels the effect of being able to re-use the injected current.

$$\frac{1}{\tau_{rec}} = \frac{1}{\tau_{SRH}} + \frac{1}{\tau_{Auger}} + \frac{S_{BOX}}{Si_H} + \frac{S_{TOP}}{Si_H} \quad (6)$$

Thus, to take advantage of the multiple-pass VOA, the additional intrinsic region width required to accommodate the next waveguide must be minimized. The example intrinsic region width shown in FIG. 2 is 1.9 µm. To add an additional 500 nm waveguide also requires adding a small gap between the waveguides, but waveguides passing close to one another provide a coupler, which is not desirable in a VOA. Thus, a large gap is desirable, but this decreases the free-carrier lifetime and begins to negate the benefits of the second waveguide. For the example above, a 1.4 µm gap results in minimal coupling between the waveguides, but also cancels the effect of the second waveguide, so the challenge is to find an engineering solution to minimize this gap.

Figure 4:
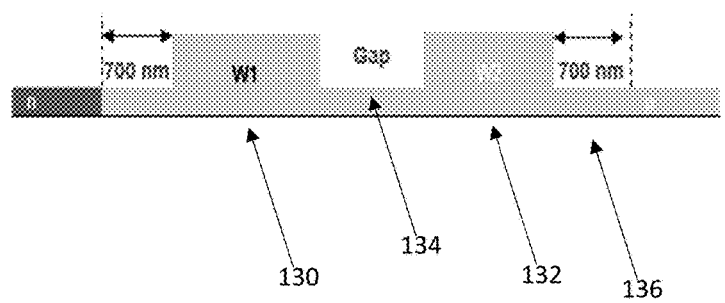
FIG. 4 is a schematic diagram and a table illustrating another embodiment of the SiP VOA of the present disclosure, utilizing an asymmetrical waveguide configuration to mitigate waveguide coupling.

The two (or more) waveguides may be brought very close to each other, while minimizing coupling, by breaking the symmetry of the waveguides and providing an asymmetric configuration. Using dissimilar waveguides in which the wave velocities are different avoids resonant coupling between them. This is especially true when the waveguides are long, which is typically required for making a VOA. Simulations have shown that acceptable coupling can be achieved by increasing the width of one waveguide by 50 nm, for example, while decreasing the width of the other waveguide by 50 nm, for example, and separating them by 500 nm, for example, for only a 50% increase in intrinsic region width in this case. This is illustrated in FIG. 4, where the width of waveguide W1 130, the width of waveguide W2 132, the width of the gap 134, and the width of the overall intrinsic region 136 are all provided and variable.

Thus, the objective of a free-carrier VOA in SiP is to build a forward-biased PIN structure and pass a waveguide through the intrinsic region. More attenuation is achieved by adding additional sections, by passing more current, or both.

The goal of many practical VOA tasks is high attenuation, which drives high currents, multiple sections, or both. The result is high power dissipation due to the additional "turn-on" or "knee" voltages of each of the diodes.

Using the concept of the present disclosure, passing two or more waveguides through a single PIN structure and "re-using" the current in the second, third, and fourth waveguides, for example, achieves up to 2× additional attenuation for the same amount of voltage, current, and power. There are practical implementation penalties that degrade attenuation above 2×, but practical implementations can achieve notable improvements in the attenuation. The reality is that any additional attenuation is desirable because of the notable power penalty of having to turn on the increased number of diode junctions in a multi-section VOA. The additional waveguide passes are easily fabricated in a SiP process. Further, the waveguide-waveguide coupling can be mitigated by careful design of the widths of waveguides and the gap between them, using an asymmetric configuration.

To date, only single-pass free-carrier SiP VOAs have been developed where changing the segment lengths or adding more segments are the techniques used to change the properties of the VOA. The present disclosure provides a multi-pass design, with more than one waveguide in each VOA segment instead of adding additional single-waveguide segments. Simulations have shown that it is possible and desirable to tune the waveguide design to allow tighter waveguide spacing, and thus allow notably less intrinsic region width than would otherwise be required.

Again, related to the multi-pass TPS, the present disclosure provides low-speed but low-power consumption phase shifters, which are again important building blocks because of the difficulty in precisely controlling the phase of an optical wave propagating in a waveguide. Although fabricated waveguide lengths are generally known precisely, the roughness associated with the waveguide randomly changes the optical mode effective index and, thus, makes the phase uncertainty larger than a radians. As a result, active control of the phase is included in most interferometer-based structures. Thus, the present disclosure improves the power efficiency of such phase-shifting building blocks.

Figure 5:
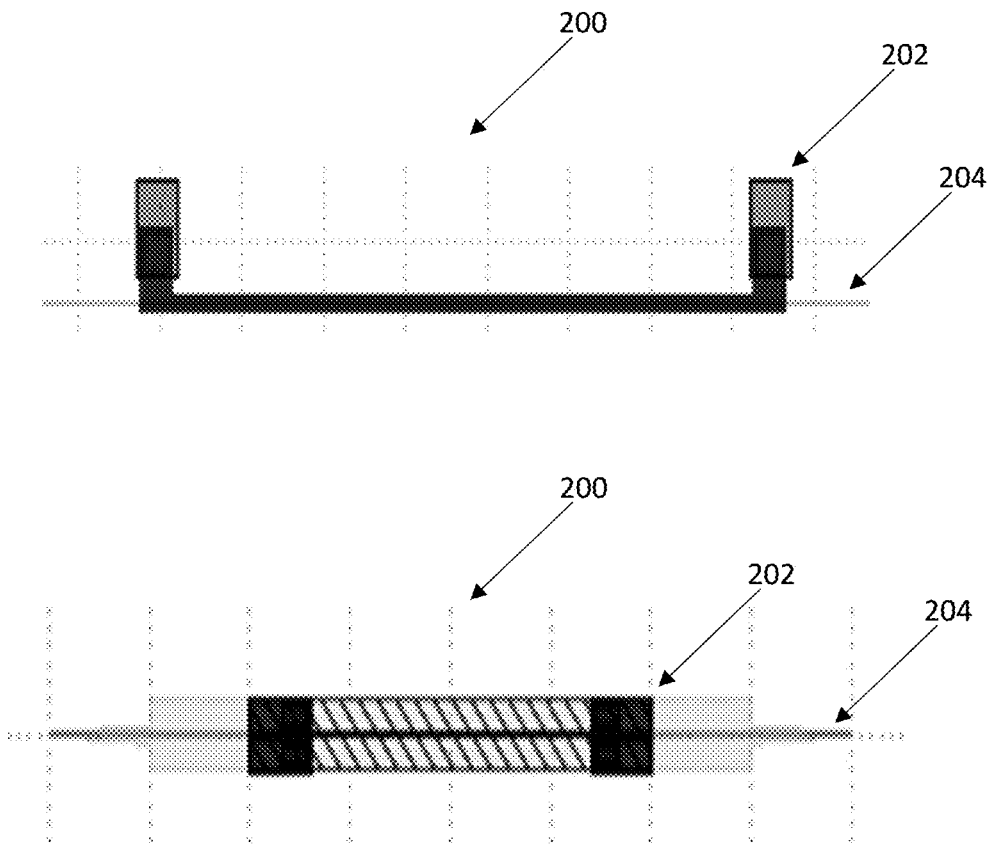
FIG. 5 is a schematic diagram illustrating a conventional SiP TPS, utilizing a one-pass waveguide.
Figure 6:
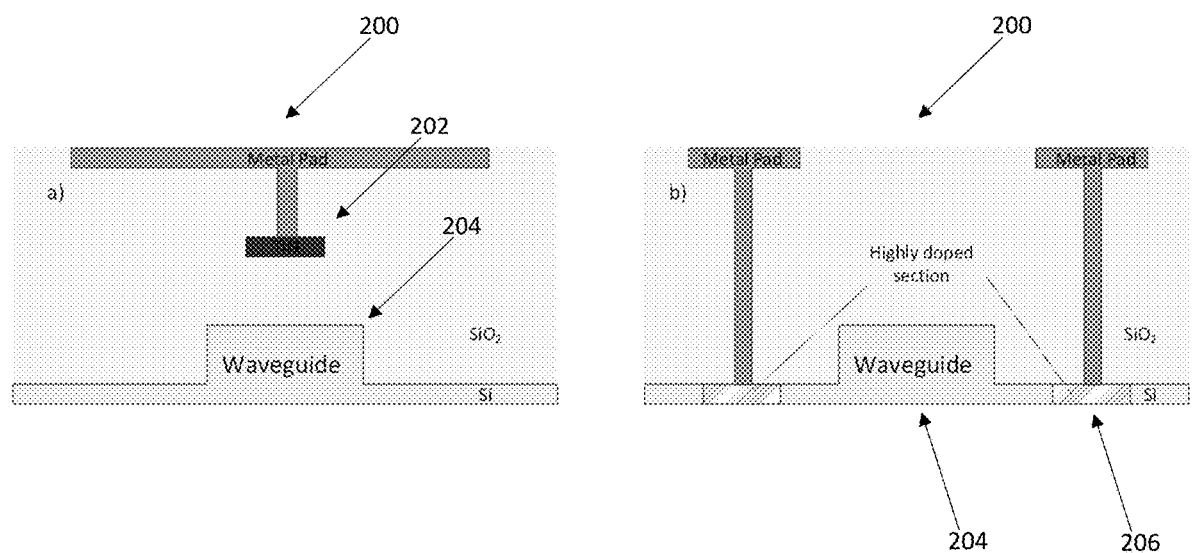
FIG. 6 is another schematic diagram illustrating a conventional SiP TPS, utilizing a one-pass waveguide.

Referring now specifically to FIGS. 5 and 6, usually, low-speed phase shifters are based on the thermal effect since it does not introduce optical losses. A temperature variation modifies the index of the material (Δn), which results in a phase variation of the optical wave (Δϕ) through the following equation:

$$\Delta\phi = \frac{2\pi\Delta n(T)L}{\lambda} \quad (7)$$

where L is the length of the waveguide and λ is the optical wavelength in a vacuum. TPSs 200 are typically made of a resistive material 202 or 206 positioned near the optical waveguide 204. As one example, SiP foundries utilize titanium nitride (TiN) located a few microns above the silicon waveguide layers. This distance prevents the TiN or the metallic contacts from adding any additional unwanted optical absorption. Another approach in SiP is to use highly-doped sections of silicon 206 positioned close to the optical waveguide 204 as the resistive elements. As with the TiN heater, the distance between the doped area and the optical mode is important to prevent unintentional additional optical losses. The distance between the N++ areas and the waveguide in the component shown is 700 nm, for example; a value more than enough to prevent significant optical losses.

To improve TPS efficiency, it is often proposed to confine the heat in the vicinity of the optical mode. Since the heat is more confined, the accumulated phase shift is increased because the temperature increase is larger for a given input electrical power. This is typically done by etching the silica around the waveguide or by continuing the etch to remove the silica below the waveguide (called the buried-oxide or BOX) to generate what is called a suspended waveguide. In both cases, the air is a better isolator, and thus, this strategy improves TPS power efficiency. However, since the heat is more confined, it also takes more time for the heat to diffuse away when the electrical power is turned off. As a result, in this other method of improving the efficiency of a TPS, the sum of the rising and falling edge transition times will be significantly increased, which reduces the modulation bandwidth of the TPS. Of note, the TPS 200 has increased heat efficiency without changing the bandwidth significantly. If one increases the carrier lifetime, the attenuation will be larger, but the BW will be reduced. The present disclosure includes reducing the carrier lifetime (because there are more recombination sites due to larger Si/SiO$_2$ interface) but still improves the efficiency.

As described above, it can be seen from equation (7) that if the temperature variation is larger (for a given amount of electrical power), the resulting phase shift is indeed larger, thus improving the TPS efficiency. Instead, the present disclosure proposes improving the power efficiency by increasing the length of the path traveled by the light inside the device. This is done by two different means.

Figure 7:
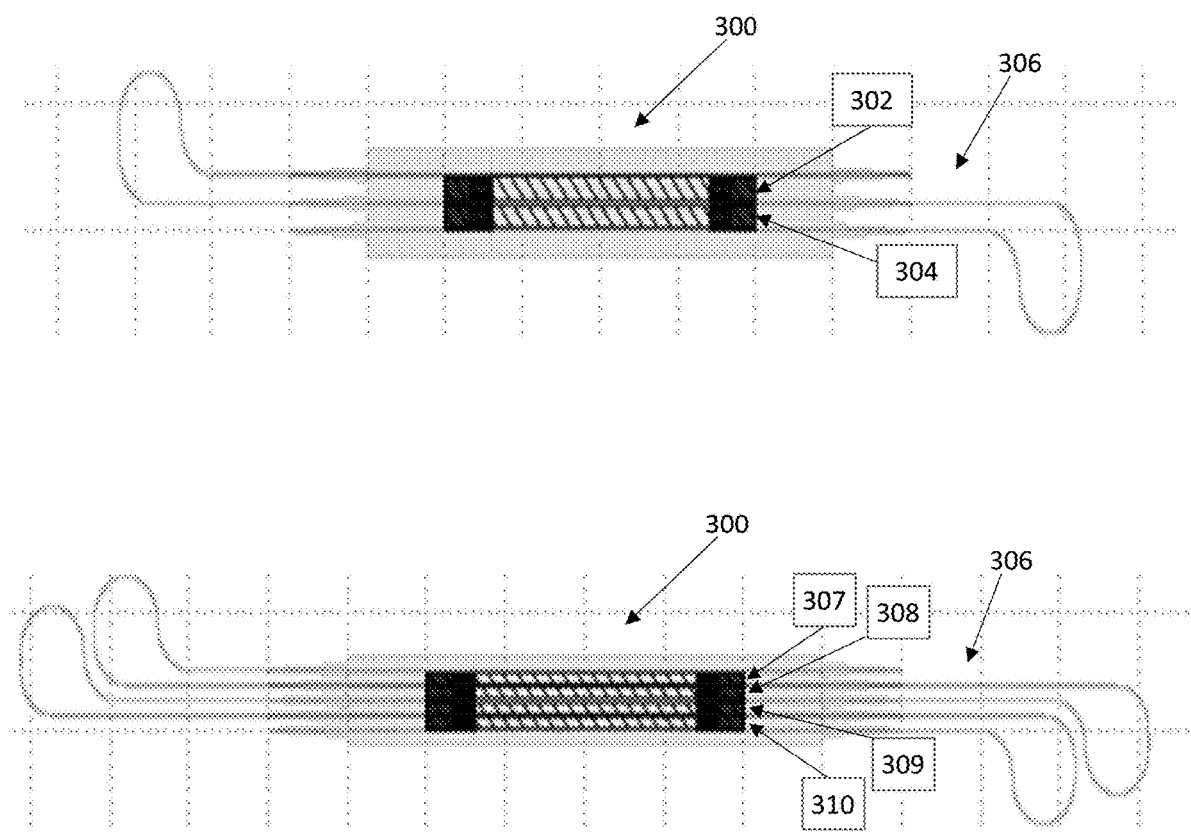
FIG. 7 is a series of schematic diagrams illustrating several embodiments of the SiP TPS of the present disclosure, utilizing a two-pass waveguide and a three-pass waveguide, respectively.

Referring now specifically to FIG. 7, the first approach utilized by the TPS 300 of the present disclosure consists of adding two waveguide sections to the opposite sides of the two heaters 302 and 304. The unitary waveguide 306 is routed on the outer edge of the first heater 302, turned/bent and brought back between the two heater elements 302 and 304, and then turned/bent again to pass by the outer edge of the other heater 304. The inner waveguide pass has heater elements 302 and 304 on both sides, while the outer waveguide sections are slightly cooler because there is only a heater 302 or 304 on one side. An improved variation of this idea consists of splitting these two heaters 302 and 304 into more smaller heaters 307, 308, 309, and 310, thus allowing more optical waveguide sections to pass between the heaters.

Since the TPS 300 is hotter between two heaters 302 and 304, a second approach consists of passing more waveguide sections in this central area. Unfortunately, if the two heaters 302 and 304 are farther apart, the peak temperature is reduced, thus reducing the TPS efficiency. So, this second approach consists of using waveguide sections of different geometry (here, the width is varied) to minimize optical coupling and thus reducing to a minimum the distance between the two heaters 302 and 304. This, again, is the basic concept illustrated in FIG. 4, and also shown in FIG. 11.

Thus, instead of passing once, the optical waveguide passes several times around the heater(s). The optical waveguide may be bent twice to enable passing through the "hot zone" two additional times, for example. Alternatively, the N++ heater elements may be cut into narrower sections to allow the optical waveguide to pass between the heaters more times. As a result, the total optical path is longer, which improves the TPS efficiency even more. The total electrical resistance of the structure is kept the same.

Figure 8:
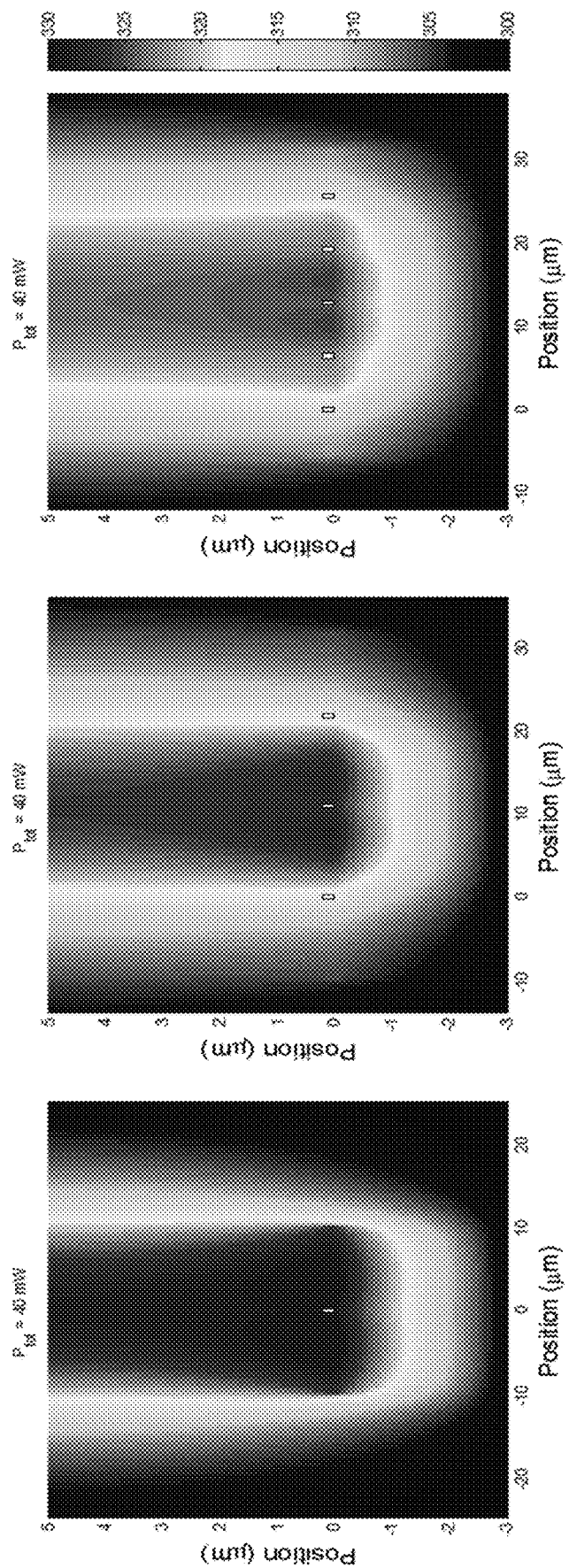
FIG. 8 is a series of temperature profile images for one-pass, three-pass, and five pass TPS devices, respectively, when 40 mW of electrical power is dissipated.

FIG. 8 is a series of temperature profile images for one-pass, three-pass, and five pass TPS devices, respectively, when 40 mW of electrical power is dissipated. The small boxes represent the optical waveguides. The power dissipated in these simulations corresponds to a π phase shift in the nominal design. Each of the designs has an identical electrical resistance. The resistive elements have the same geometry (i.e., length and width) in the first two cases, whereas the resistive element in the third case is split into four resistive elements of the same length, but with a width smaller by a factor of two. This modification allows two optical waveguides to be placed between the heaters. For each device, the peak temperature rise is lower than 30° C. The peak temperature is slightly higher, and the heat is a bit more confined in the TPS with fewer optical waveguides because the distance between the heaters is increased to make room for the other waveguides. Increasing the TPS width reduces the peak temperature.

Figure 9:
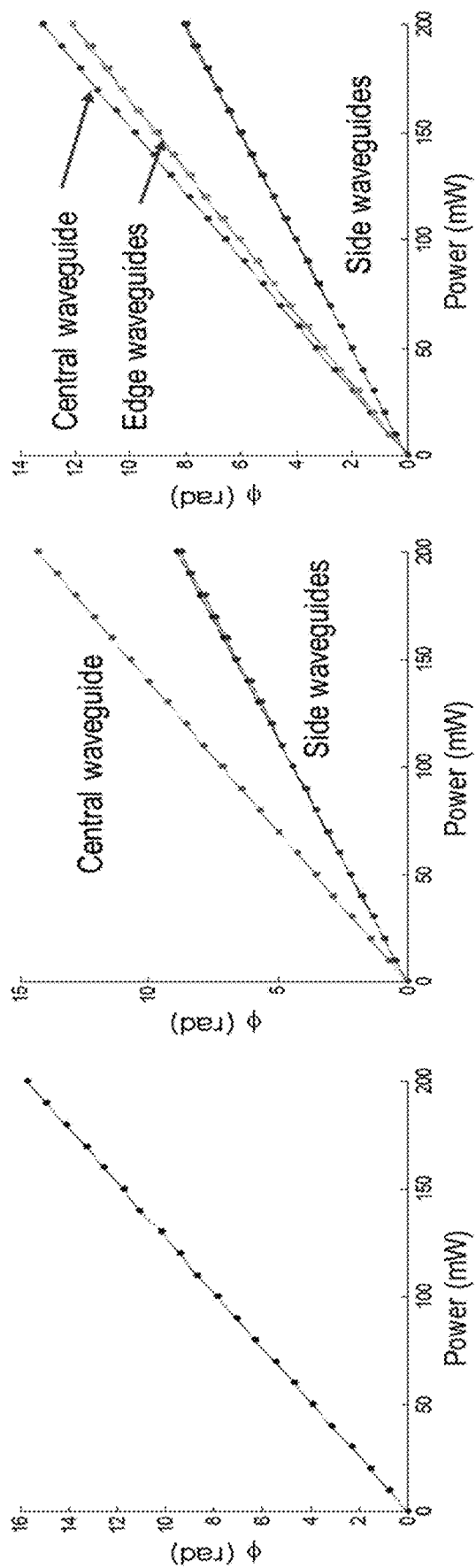
FIG. 9 is a series of plots showing the phase shift accumulated per waveguide for one-pass, three-pass, and five pass TPS devices, respectively.

FIG. 9 is a series of plots showing the phase shift accumulated per waveguide for one-pass, three-pass, and five pass TPS devices, respectively. Each phase shift is calculated per waveguide passage. As mentioned above, the central waveguide accumulates more phase shift than the side waveguides because it is warmer than the others. Furthermore, a small degradation can be seen between the central waveguide of the one-pass design with respect to the two other designs due to the reduction of the temperature confinement discussed above. However, the degradation is much smaller than the gain provided by the multiple passes.

Figure 10:
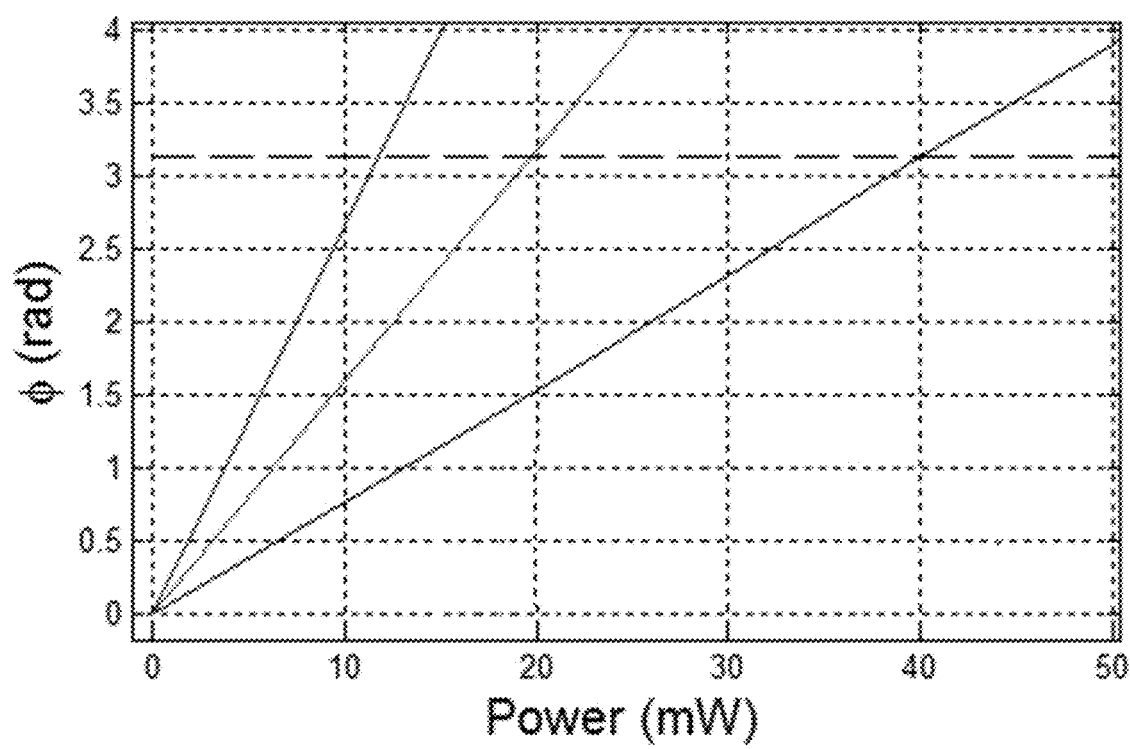
FIG. 10 is a plot showing the total phase shift accumulated for one-pass, three-pass, and five pass TPS devices, respectively.

FIG. 10 is a plot showing the total phase shift accumulated for one-pass, three-pass, and five pass TPS devices, respectively. The three-pass device is about twice as efficient as the initial component (since the side waveguides are two times less efficient than the central one), whereas the five-pass device is about four times more efficient (i.e., the waveguides next to the central waveguide are almost as efficient as the central waveguide). So, even if the peak temperature is slightly reduced, the gain coming from the increased L is making these TPS devices considerably more efficient.

The number of waveguides used in this multi-pass TPS approach can be increased up to the point where the minimum feature size of the doped area and/or of the metal vias to connect the heaters is reached. Considering the typical overall fabrication width, a maximum of seven passages is typically allowed.

The second approach to increase the TPS efficiency is described above. Since inner waveguides are more efficient than the outer waveguides, the approach can be optimized by putting more waveguides in the central section between a pair of heater elements. To do this, the waveguides need to be placed very close to prevent the heat from spreading over a larger area, thus making the TPS less efficient. However, the waveguide cannot be positioned too close to the heater (due to optical losses), and they cannot be placed too close together because the light is coupled from one waveguide to the other, which creates multi-path interference, thus making this component unusable (i.e., two waveguides spaced by ~2 μm are considered to be completely uncoupled). To work around this limitation, it is indeed possible to place the waveguides very close together (about 500 nm) by making their cross-sections different. Two slightly different waveguides (i.e., with different waveguide widths) can be placed close together with very limited interaction.

When two waveguides are close together, some portion of the light is coupled from the first waveguide into the second. However, if their geometries are different (i.e., if they have different effective and group indices), the light in both waveguides will propagate at different speeds. As a result, the light coupled to the second waveguide at a certain location will be at a different phase as compared to the light coupled at a different location. This destructive interference will thus prevent the light from being truly coupled into the second waveguide. This effect allows the placement of two waveguides very close together in the thermally active region, thus improving the TPS performance.

Figure 11:
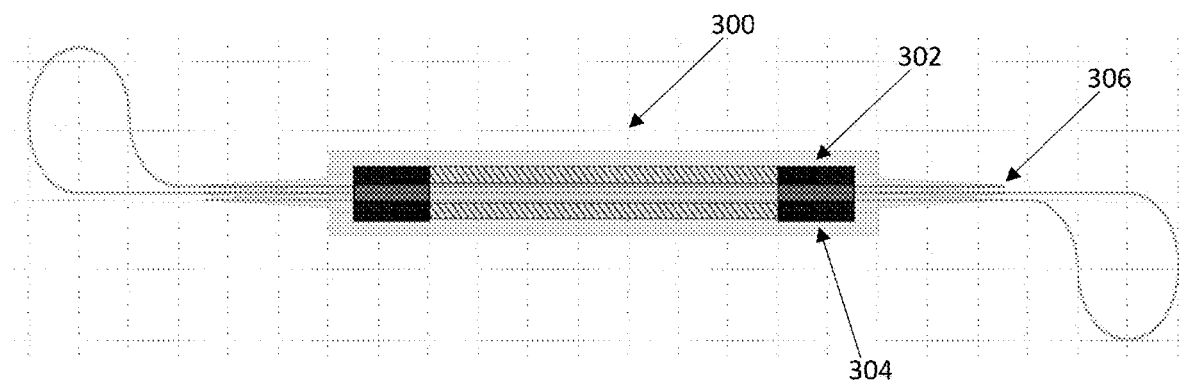
FIG. 11 is a schematic diagram illustrating another embodiment of the SiP TPS of the present disclosure, utilizing a center multi-pass waveguide.

Thus, implementing the general layouts shown in FIG. 7, but where the outer waveguides are placed inside the central region as illustrated in FIG. 11 will improve the performance of the three-pass TPS by a factor of 3 instead of 2 as compared to the original design. More waveguides can, of course, be added. For example, utilizing five waveguides will improve the performance by a factor of 5. The number of waveguides can be increased up to the point where the temperature profiles become too broad. In this situation, the gain of the increased length will be balanced by the peak temperature reduction.

Thus, this asymmetric waveguide idea can be combined with the multi-pass TPS idea. Since this latter approach is limited to seven passes, for example, to increase the optical waveguide length, even more, a set of asymmetric waveguides between the heater pairs can be used to increase the TPS length even more.

As described herein, a multi-passage variable optical attenuator is described based on a forward-biased PIN junction. Also, a multi-passage phase shifter could be fabricated based on a forward-biased PIN junction. The injection of carriers into the waveguide situated in the intrinsic region of the PIN junction changes its effective index, thus changing its phase (optical length). This phase shift comes with an amplitude modulation as well, but the phase shift is relatively large for small to modest amounts of attenuation. One possible advantage of this current-injection phase shifter is a notably higher bandwidth, but at the expense of an optical attenuation.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A multi-pass free-carrier absorption variable optical attenuator device, comprising:
a diode structure comprising a P-type doped region and an N-type doped region separated by an intrinsic region; and
a single optical waveguide comprising a plurality of optical waveguide sections continuously interconnected to one another and aligned parallel to one another, wherein the plurality of optical waveguide sections are disposed between the P-type doped region and the N-type doped region and the optical waveguide traverse multiple passes within the intrinsic region of the diode structure via the plurality of optical waveguide sections, wherein the plurality of optical waveguide sections is coupled via one or more curved/bent sections of the optical waveguide that each include a single bend with a bend radius that is an order of magnitude less in length than each optical waveguide section.

2. The multi-pass free-carrier absorption variable optical attenuator device of claim 1, wherein the P-type doped region forms a portion of an anode connection of the diode structure.

3. The multi-pass free-carrier absorption variable optical attenuator device of claim 1, wherein the N-type doped region forms a portion of a cathode connection of the diode structure.

4. The multi-pass free-carrier absorption variable optical attenuator device of claim 1, wherein the plurality of optical waveguide sections has a length on the order of hundreds of microns and the one or more connecting curved/bent sections have a length on order of tens of microns.

5. The multi-pass free-carrier absorption variable optical attenuator device of claim 1, wherein at least two of the optical waveguide sections have different geometries and are separated by a predetermined gap.

6. The multi-pass free-carrier absorption variable optical attenuator device of claim 5, wherein the at least two of the optical waveguide sections have different widths and are separated by the predetermined gap.

7. A multi-pass thermal phase shifter device, comprising:
a silicon structure comprising or coupled to one or more heater elements; and
a single optical waveguide comprising a plurality of optical waveguide sections continuously interconnected to one another and aligned parallel to one another, wherein the plurality of optical waveguide sections are disposed near to the one or more heater elements and the optical waveguide traverse multiple passes in a central area via the plurality of optical waveguide sections, wherein at least two of the optical waveguide sections have a same length and different widths by a factor of two.

8. The multi-pass thermal phase shifter device of claim 7, wherein the silicon structure comprises one or more P-type doped or N-type doped regions that form the one or more heater elements.

9. The multi-pass thermal phase shifter device of claim 8, wherein the thermal phase shifter structure contains one or more metallic heater elements in close proximity to the silicon waveguide.

10. The multi-pass thermal phase shifter device of claim 7, wherein at least two of the optical waveguide sections have different geometries and are separated by a predetermined gap.

11. The multi-pass thermal phase shifter device of claim 10, wherein the at least two of the optical waveguide sections have different widths and are separated by the predetermined gap.

12. The multi-pass thermal phase shifter device of claim 7, wherein the optical waveguide has one input on one side of the central area and one output on another side of the central area with the plurality of optical waveguide sections connecting the input and the output.

13. The multi-pass thermal phase shifter device of claim 7, wherein current flows through the plurality of sections in the optical waveguide for the multiple passes.

14. The multi-pass free-carrier absorption variable optical attenuator device of claim 1, wherein the optical waveguide is a single waveguide with the plurality of optical waveguide sections.

15. The multi-pass free-carrier absorption variable optical attenuator device of claim 1, wherein the optical waveguide has one input on one side of the central area and one output on another side of the central area with the plurality of optical waveguide sections connecting the input and the output.

16. The multi-pass free-carrier absorption variable optical attenuator device of claim 1, wherein current flows through the plurality of sections in the optical waveguide for the multiple passes.

17. The multi-pass free-carrier absorption variable optical attenuator device of claim 1, wherein the multiple passes include at least three passes.

18. The multi-pass free-carrier absorption variable optical attenuator device of claim 1, wherein at least two of the optical waveguide sections have different widths.

* * * * *